United States Patent
Bradshaw et al.

(10) Patent No.: US 10,768,961 B2
(45) Date of Patent: Sep. 8, 2020

(54) VIRTUAL MACHINE SEED IMAGE REPLICATION THROUGH PARALLEL DEPLOYMENT

(71) Applicant: International Business Machines Corporation, Armonk, NY (US)

(72) Inventors: Paul L. Bradshaw, Santa Cruz, CA (US); Richard E. Harper, Chapel Hill, NC (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 15/210,407

(22) Filed: Jul. 14, 2016

(65) Prior Publication Data

US 2018/0018191 A1 Jan. 18, 2018

(51) Int. Cl.
*G06F 9/455* (2018.01)
*G06F 8/60* (2018.01)
*G06F 11/20* (2006.01)
*G06F 8/61* (2018.01)

(52) U.S. Cl.
CPC ............ *G06F 9/45558* (2013.01); *G06F 8/60* (2013.01); *G06F 8/63* (2013.01); *G06F 11/2023* (2013.01); *G06F 11/2038* (2013.01); *G06F 11/2048* (2013.01); *G06F 11/2056* (2013.01); *G06F 2009/45562* (2013.01);
(Continued)

(58) Field of Classification Search
CPC ............ G06F 9/45558; G06F 8/60–63; G06F 11/2023–2056
See application file for complete search history.

(56) References Cited

U.S. PATENT DOCUMENTS 9,110,693 B1 * 8/2015 Meiri ................... G06F 9/4856
2006/0174238 A1    8/2006 Henseler et al.
(Continued)

OTHER PUBLICATIONS

Interactive Resource-Intensive Applications Made Easy H. Andres Lagar-Cavilla, Niraj Tolia, Eyal de Lara, M. Satyanarayanan, and David O'Hallaron (Year: 2007).*
(Continued)

*Primary Examiner* — Emerson C Puente
*Assistant Examiner* — Paul V Mills
(74) *Attorney, Agent, or Firm* — Yee & Associates, P.C.

(57) ABSTRACT

Generating secondary virtual machine seed image storage is provided. An input is received to deploy a primary virtual machine and a secondary virtual machine based on a golden virtual machine image. In response, the primary virtual machine from the golden virtual machine image on a primary data processing site and the secondary virtual machine from the golden virtual machine image on a secondary data processing site are deployed. Execution of the secondary virtual machine is suspended on the secondary data processing site. Using the golden virtual machine image, a seed image corresponding to the secondary virtual machine is generated that is up-to-date at that point in time in storage at the secondary data processing site to form the secondary virtual machine seed image storage. The secondary virtual machine seed image storage is enabled to receive state data updates from the primary virtual machine on the primary data processing site.

16 Claims, 8 Drawing Sheets

(52) U.S. Cl.
CPC .............. *G06F 2009/45575* (2013.01); *G06F 2009/45579* (2013.01); *G06F 2201/815* (2013.01)

(56) References Cited

U.S. PATENT DOCUMENTS

| | | | |
|---|---|---|---|
| 2008/0222375 A1* | 9/2008 | Kotsovinos | G06F 9/5083 711/162 |
| 2009/0113109 A1* | 4/2009 | Nelson | G06F 11/203 711/6 |
| 2011/0071983 A1* | 3/2011 | Murase | G06F 9/5088 707/649 |
| 2012/0084445 A1* | 4/2012 | Brock | G06F 9/5077 709/226 |
| 2012/0192175 A1 | 7/2012 | Dorai et al. | |
| 2012/0254861 A1 | 10/2012 | Down, Jr. et al. | |
| 2012/0272244 A1 | 10/2012 | Bozek et al. | |
| 2013/0007732 A1 | 1/2013 | Fries et al. | |
| 2013/0007733 A1 | 1/2013 | Fries et al. | |
| 2013/0061089 A1* | 3/2013 | Valiyaparambil | G06F 11/1451 714/15 |
| 2013/0124353 A1 | 5/2013 | Dhoolia et al. | |
| 2016/0092188 A1* | 3/2016 | Kuchibhotla | G06F 8/71 717/176 |

OTHER PUBLICATIONS

Optimizing Live Migration of Virtual Machines Across Wide Area Networks Using Integrated Replication and Scheduling Sumit Kumar Bose, Scott Brock, Ronald Skeoch, et al. (Year: 2011).*
OpenStack Virtual Machine Image Guide the OpenStack Foundation Selected portions (Year: 2015).*
The Expert Guide to VMware Disaster Recovery and Data Protection Mike Preston (Year: 2015).*
Hyper-V Replica in depth Mike Resseler (Year: 2014).*
Buncic et al., "CernVM: Minimal Maintenance Approach to Virtualization," Journal of Physics: Conference Series, vol. 331, Part 5: Computing Fabrics and Networking Technologies, Dec. 2011, pp. 1-7.
Mell et al., "The NIST Definition of Cloud Computing," National Institute of Standards and Technology Special Publication 800-145, Sep. 2011, 7 pages.
Nishimura et al., "Applying Flexibility in Scale-out-based Web Cloud to Future Telecommunication Session Control Systems," 16th International Conference on Intelligence in Next Generation Networks, Oct. 2012, pp. 1-7.
Zhang et al., "Information Security Underlying Transparent Computing: Impacts, Visions and Challenges," Web Intelligence and Agent Systems: An International Journal. vol. 8, No. 2, Apr. 2010, pp. 203-217.

* cited by examiner

VIRTUAL MACHINE SEED IMAGE REPLICATION THROUGH PARALLEL DEPLOYMENT

BACKGROUND

1. Field

The disclosure relates generally to disaster recovery and more specifically to virtual machine seed image replication through parallel deployment for disaster recovery.

2. Description of the Related Art

To achieve high availability and disaster recovery of a computing environment, client workloads need to be monitored. In the event of a failure, whether a local failure or a disaster, the client workload on a failed computing environment must be restarted on a failover computing environment. In addition, virtualization adds complexity to any disaster recovery situation.

SUMMARY

According to one illustrative embodiment, a computer-implemented method for generating secondary virtual machine seed image storage is provided. A computer receives an input to deploy a primary virtual machine and a secondary virtual machine based on a golden virtual machine image. In response to the computer receiving the input, the computer deploys the primary virtual machine from the golden virtual machine image on a primary data processing site and the secondary virtual machine from the golden virtual machine image on a secondary data processing site. The computer suspends execution of the secondary virtual machine on the secondary data processing site. The computer using the golden virtual machine image generates a seed image corresponding to the secondary virtual machine that is up-to-date at that point in time in storage at the secondary data processing site to form the secondary virtual machine seed image storage. The computer enables the secondary virtual machine seed image storage to receive state data updates from the primary virtual machine on the primary data processing site. According to other illustrative embodiments, a computer system and computer program product for generating secondary virtual machine seed image storage are provided.

DETAILED DESCRIPTION

Figure 1:
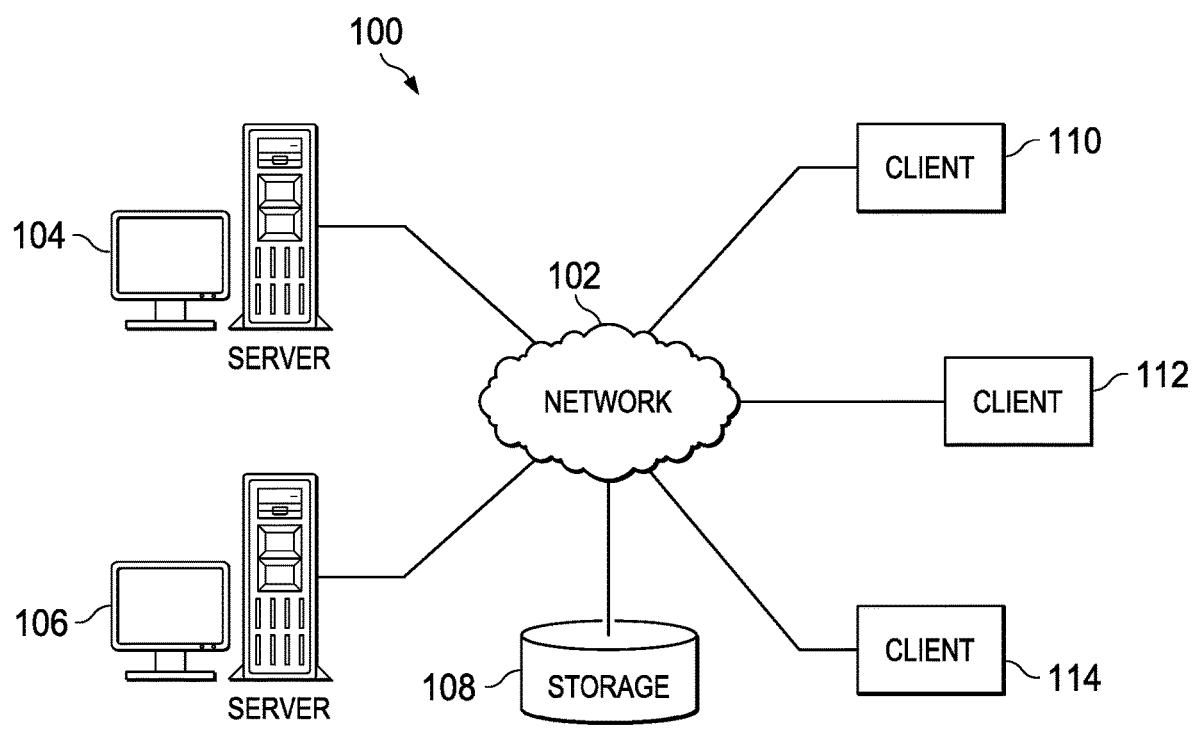
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-7, diagrams of data processing environments are provided in which illustrative embodiments may be implemented. It should be appreciated that FIGS. 1-7 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 or server 106 may, for example, manage recovery of a customer workload after failure of a primary computing environment executing the customer workload. The failed primary computing environment may be, for example, a server or a set of servers in a data center environment or a cloud environment. Server 104 or server 106 also may generate a secondary virtual machine seed image storage at a secondary data processing site for the failure recovery. The configuration of the secondary data processing site is similar to the configuration of the primary data processing site.

Client 110, client 112, and client 114 also connect to network 102. Clients 110, 112, and 114 are clients of server 104 and/or server 106. Server 104 and server 106 may provide information, such as boot files, operating system images, virtual machine images, and software applications to clients 110, 112, and 114.

In this example, clients 110, 112, and 114 may each represent a different computing environment. A computing environment includes physical and software resources used to execute a set of one or more customer workloads or tasks. A computing environment may comprise, for example, one server, a rack of servers, a cluster of servers, such as a data center, a cloud of computers, such as a private cloud, a public cloud, or a hybrid cloud, or any combination thereof. In addition, each of clients 110, 112, and 114 may be a primary data processing site or a secondary data processing site. A primary data processing site initially executes a customer workload using a set of primary virtual machines and images. A secondary data processing site executes the customer workload using a set of secondary virtual machines and seed images when one or more primary virtual machines fail while processing the customer workload at the primary data processing site.

Storage 108 is a network storage device capable of storing any type of data in a structured format or an unstructured format. The type of data stored in storage 108 may be, for example, a list of computing environments with corresponding available resources, a list of primary data processing sites, a list of secondary data processing sites, a list of customer workloads, a plurality of virtual machine images, and the like. Further, storage unit 108 may store other types of data, such as authentication or credential data that may include user names, passwords, and biometric data associated with system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
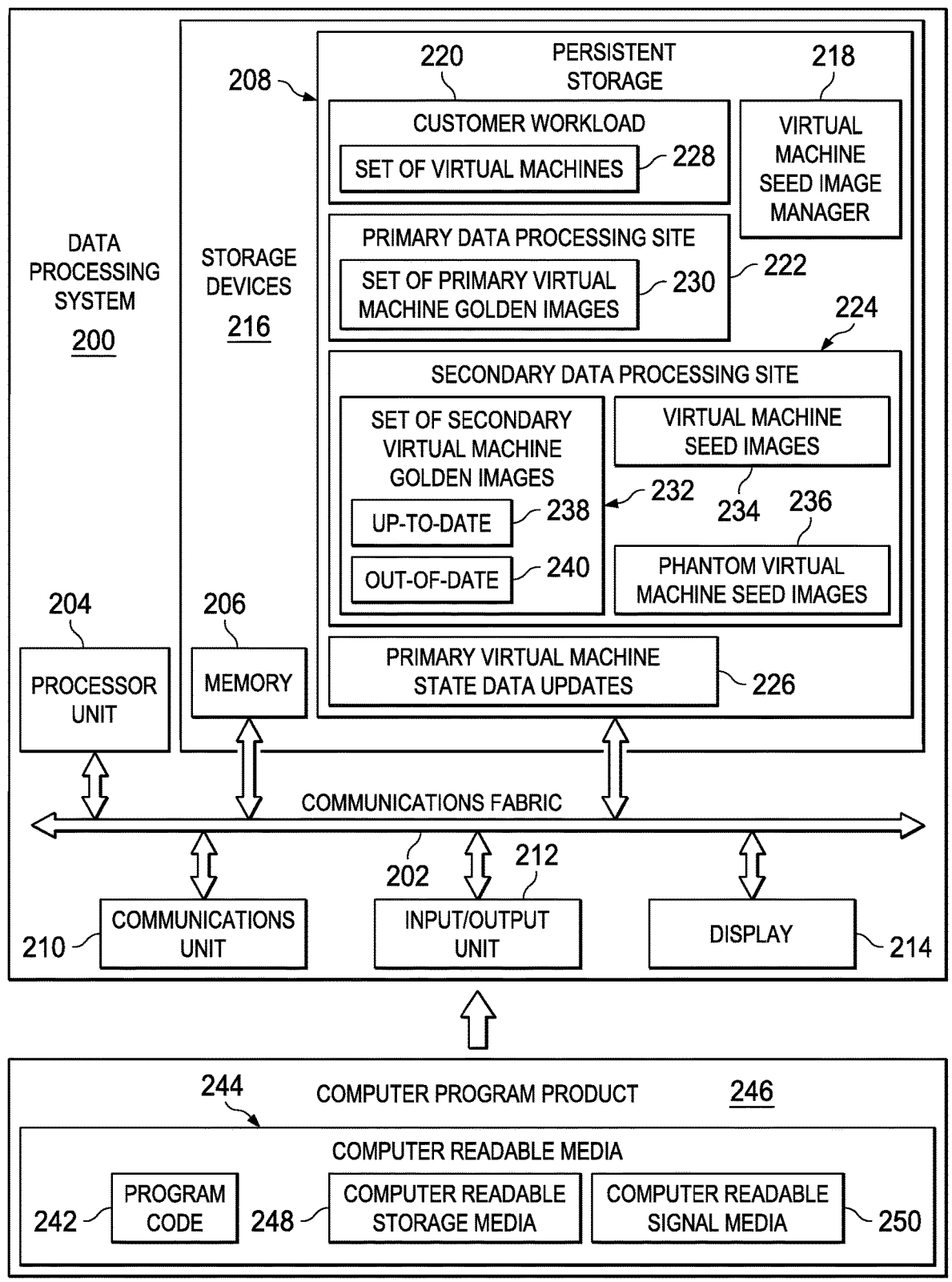
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores virtual machine seed image manager 218. Virtual machine seed image manager 218 monitors and controls generation of secondary virtual machine seed image storage at secondary data processing sites for disaster recovery of customer workloads on failed primary data processing sites. It should be noted that even though virtual machine seed image manager 218 is illustrated as residing in persistent storage 208, in an alternative illustrative embodiment virtual machine seed image manager 218 may be a separate component of data processing system 200. For example, virtual machine seed image manager 218 may be a hardware component coupled to communication fabric 202 or a combination of hardware and software components.

Also in this example, persistent storage 208 stores customer workload 220, primary data processing site 222, secondary data processing site 224, and primary virtual machine state data updates 226. Customer workload 220 represents data corresponding to a workload of a customer that is executing in a virtual machine environment on primary data processing site 222. Primary data processing site 222 represents data corresponding to the data processing site initially executing customer workload 220. Primary data processing site 222 may be, for example, client 110 in FIG. 1. Set of virtual machines 228 represents information regarding the virtual machines needed to execute customer workload 220. The information may be, for example, unique identifiers, types, and numbers of virtual machines needed to execute customer workload 220.

It should be noted that customer workload 220 may represent a list of a plurality of different customer workloads performed by a set of one or more clients, which are disaster recovery managed by data processing system 200. Also, it should be noted that primary data processing site 222 may represent a list of a plurality of different primary data processing sites executing a plurality of different customer workloads.

Primary data processing site 222 includes set of primary virtual machine golden images 230. Set of primary virtual machine golden images 230 represents data corresponding to one or more virtual machine images that primary data processing site 222 utilizes to generate the primary virtual machines needed to execute customer workload 220 (i.e., set of virtual machines 228 corresponding to customer workload 220) on primary data processing site 222. A golden virtual machine image is a bootable virtual machine image that has been tested and certified for deployment and use on a data processing site, such as a data center or cloud.

Secondary data processing site 224 represents data corresponding to the data processing site that performs failover execution of customer workload 220 when one or more virtual machines of primary data processing site 222 fail. Secondary data processing site 224 may be, for example, client 112 in FIG. 1. Secondary data processing site 224 includes set of secondary virtual machine golden images 232, virtual machine seed images 234, and phantom virtual machine seed images 236.

Set of secondary virtual machine golden images 232 represents data corresponding to one or more virtual machine images (i.e., virtual machine seed images 234) that secondary data processing site 224 utilizes to generate the secondary virtual machines corresponding to set of virtual machines 228 needed to execute customer workload 220 on secondary data processing site 224. Virtual machine seed image manager 218 utilizes set of secondary virtual machine golden images 232 to generate virtual machine seed images 234, which are bootable virtual machine images that have their own characteristics, such as unique identifiers.

Set of secondary virtual machine golden images 232 includes up-to-date 238 and out-of-date 240. Up-to-date 238 represents those golden images in set of secondary virtual machine golden images 232 that are current or do not require updates with regard to customer workload 220. Out-of-date 240 represents those golden images in set of secondary virtual machine golden images 232 that are not current or require updates with regard to customer workload 220. It should be noted that set of secondary virtual machine golden images 232 may not include any out-of-date golden images. In other words, all of the golden images in set of secondary virtual machine golden images 232 may be currently up to date.

Phantom virtual machine seed images 236 represent one or more storage volumes that virtual machine seed image manager 218 may utilize as a target for primary virtual machine state data updates 226, instead of a virtual machine seed image that has not yet been generated on secondary data processing site 224. Primary virtual machine state data updates 226 represent up to date information regarding the current state of the primary virtual machines executing customer workload 220 on primary data processing site 222. Virtual machine seed image manager 218 utilizes primary virtual machine state data updates 226 to update virtual machine seed images 234 and/or phantom virtual machine seed images 236 either on a continuous basis or on a periodic basis. As a result, secondary data processing site 224 is ready to perform failover execution of customer workload 220 in the event of a virtual machine failure on primary data processing site 222.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 242 is located in a functional form on computer readable media 244 that is selectively removable and may be loaded onto or transferred to data processing system 200 for running by processor unit 204. Program code 242 and computer readable media 244 form computer program product 246. In one example, computer readable media 244 may be computer readable storage media 248 or computer readable signal media 250. Computer readable storage media 248 may include, for example, an optical or magnetic disc that is inserted or placed into a drive or other device that is part of persistent storage 208 for transfer onto a storage device, such as a hard drive, that is part of persistent storage 208. Computer readable storage media 248 also may take the form of a persistent storage, such as a hard drive, a thumb drive, or a flash memory that is connected to data processing system 200. In some instances, computer readable storage media 248 may not be removable from data processing system 200.

Alternatively, program code 242 may be transferred to data processing system 200 using computer readable signal media 250. Computer readable signal media 250 may be, for example, a propagated data signal containing program code 242. For example, computer readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 242 may be downloaded over a network to persistent storage 208 from another device or data processing system through computer readable signal media 250 for use within data processing system 200. For instance, program code stored in a computer readable storage media in a data processing system may be downloaded over a network from the data processing system to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
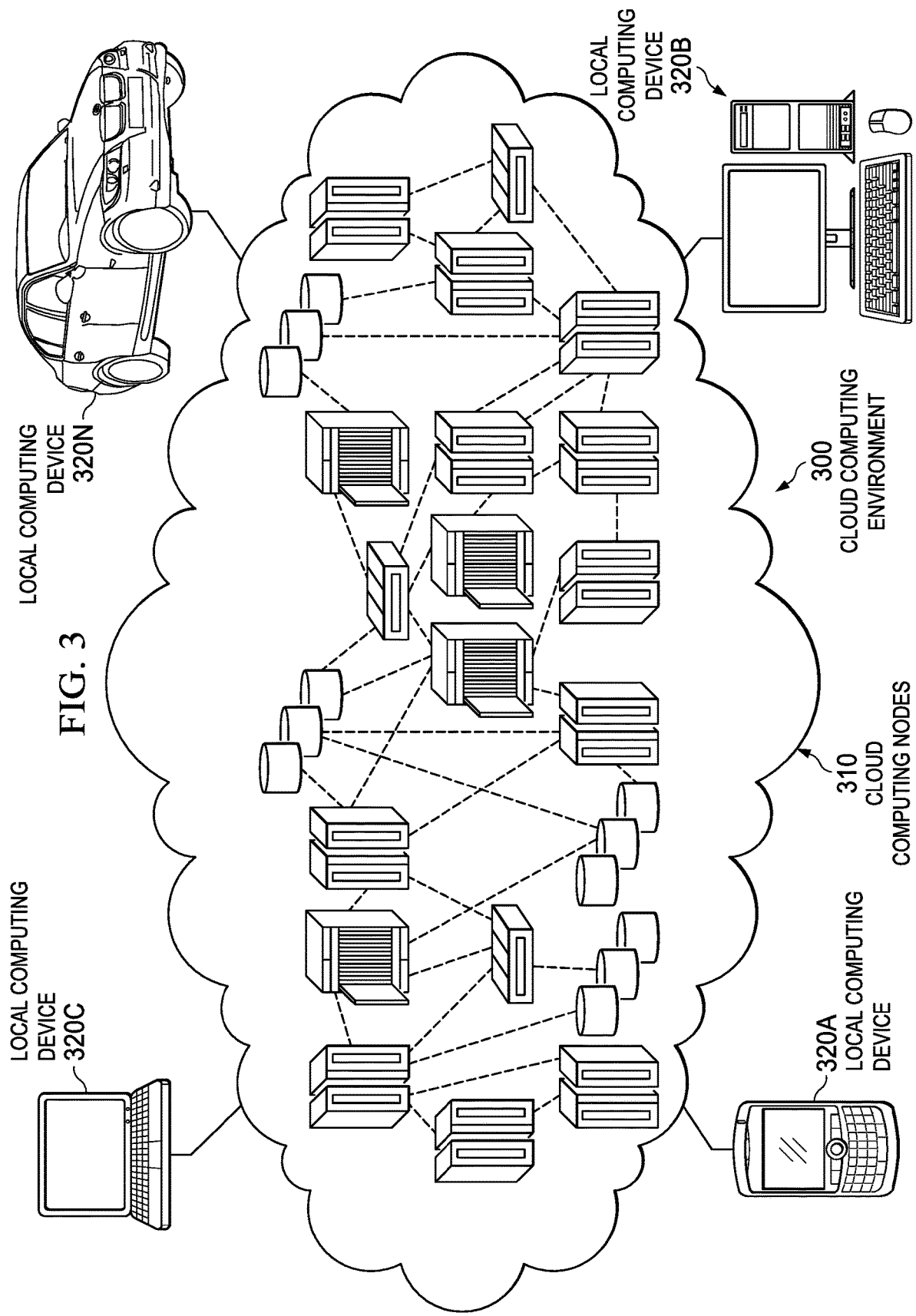
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of computing devices 320A-320N are intended to be illustrative only and that cloud computing nodes 310 and cloud computing environment 300 can communicate with any type of computerized device over any type of network and/or network addressable connection using a web browser, for example.

Figure 4:
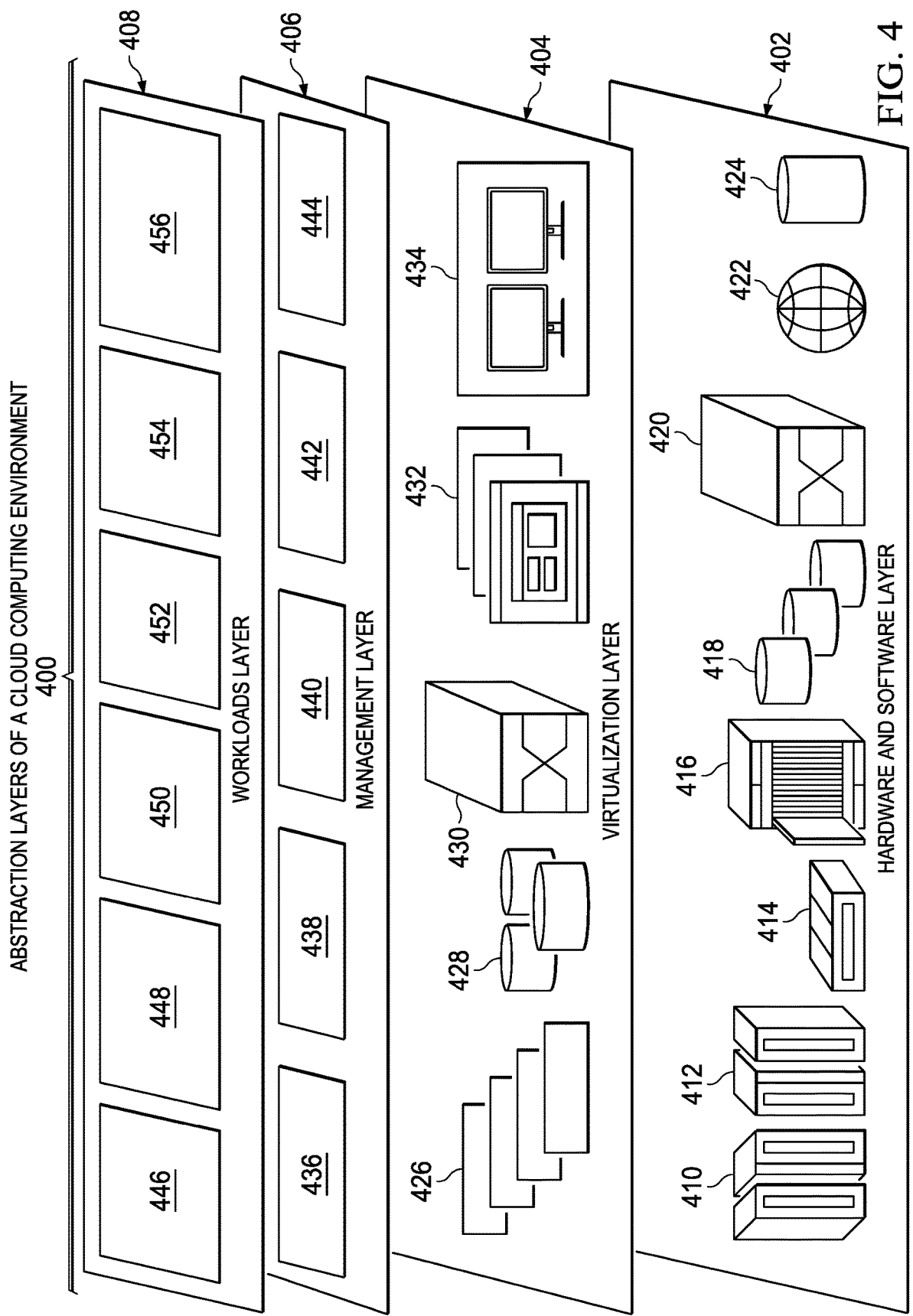
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 includes hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and virtual machine image management 456.

In virtual machine-based disaster recovery, the disaster recovery consists in part of booting a secondary virtual machine on a recovery or secondary data processing site after a failure of a primary virtual machine on a primary data processing site occurs. The secondary virtual machine's state comprises a bootable virtual machine image, which is located in storage at the secondary data processing site, that is up-to-date relative to the state of the failed primary virtual machine. This bootable virtual machine image corresponding to the secondary virtual machine is called a "secondary virtual machine seed image." As the primary virtual machine executes on the primary data processing site and writes to its primary virtual machine image in storage at the primary data processing site, the secondary virtual machine seed image is updated, either electronically or otherwise, on a continuous real time basis or on a periodic basis, such as a predetermined time interval basis. When the primary data processing site fails, the updated virtual machine seed image at the secondary data processing site is booted, thus effecting recovery from the failure.

However, using current technology it is difficult to generate this virtual machine seed image, especially at cloud scale. One current option is to electronically copy the primary virtual machine image in storage at the primary data processing site to the recovery or secondary data processing site when the primary virtual machine image is initially generated. This electronic copying of the primary virtual machine image may require an enormous amount of time and bandwidth for large images. A second current option is to generate a set of one or more tapes containing the primary virtual machine image, physically transport the set of tapes to the secondary data processing site, and read the set of tapes into the storage of the secondary data processing site to generate the secondary virtual machine seed image. This second option is expensive, cumbersome, error prone, and requires increased time and labor costs.

Illustrative embodiments may utilize a single virtual machine deployment process. For example, illustrative embodiments install a virtual machine image repository on both the primary data processing site and the secondary data processing site. This image repository contains "golden" virtual machine images that are customizable and deployable to generate production virtual machine images on the primary data processing site and the secondary data processing site. A golden virtual machine image is a bootable virtual machine image that has been tested and certified for deployment and use in, for example, a cloud environment or data center. In addition, illustrative embodiments utilize a golden virtual machine image to generate a virtual machine seed image having its own unique characteristics, such as a unique identifier.

Further, illustrative embodiments install virtual machine image deployment management tools in both the primary data processing site and the secondary data processing site. Illustrative embodiments may easily install the golden virtual machine image repositories and virtual machine image deployment management tools in both the primary data processing site and the secondary data processing site when the primary and secondary sites are similar cloud sites that back each other up, for example.

When illustrative embodiments deploy a primary virtual machine, which is to be disaster recovery protected, from the golden image in the virtual machine image repository using the virtual machine image deployment management tools on the primary site, illustrative embodiments also deploy a secondary virtual machine on the secondary data processing site at the same time using the virtual machine image deployment management tools on the secondary site. It should be noted that the secondary virtual machine is an exact same version as the primary virtual machine. In other words, illustrative embodiments generate the primary and secondary virtual machines using the same golden virtual machine image version. Illustrative embodiments suspend the secondary virtual machine to storage, thus causing illustrative embodiments to generate the seed image corresponding to the secondary virtual machine from the golden image, and enable replication of state data from the primary virtual machine to the secondary virtual machine's seed image in storage. Thus, illustrative embodiments avoid the need to replicate the primary virtual machine image from the primary data processing site to the secondary data processing site.

It should be noted that most customer workloads consist of multiple virtual machines. If a customer workload consists of multiple virtual machines, then illustrative embodiments may repeat the single virtual machine deployment process above for each virtual machine used in the workload. Ideally, the primary data processing site and the secondary data processing site have identical golden virtual machine image repositories, thus allowing illustrative embodiments to utilize the single virtual machine deployment process above for each virtual machine used in the workload. However, in many cases the primary and secondary data processing sites do not have identical golden virtual machine image repositories and, therefore, illustrative embodiments may not directly use the single virtual machine deployment process above for all of the virtual machines used in the workload.

Illustrative embodiments must generate an appropriate set of virtual machine seed images on the secondary data processing site. Each virtual machine seed image in the set of virtual machine seed images generated on the secondary data processing site corresponds to a respective virtual machine in the set of virtual machines executing on the primary data processing site. It should be noted that illustrative embodiments utilize the same up-to-date version of the golden virtual machine image corresponding to each primary virtual machine executing on the primary data processing site to generate the appropriate set of virtual machine seed images on the secondary data processing site. Furthermore, illustrative embodiments may have a choice of which secondary data processing site to use within a set of two or more candidate secondary data processing sites.

Consequently, illustrative embodiments may utilize a multiple virtual machine deployment process. For example, in many cases the primary and secondary sites do not have identical golden virtual machine image repositories. In addition, a choice of candidate secondary data processing sites may or may not exist, and the appropriate set of versions of the golden virtual machine images may or may not be available across the set of candidate secondary data processing sites. Four cases of interest are: 1) Case 0 where no choice of candidate secondary data processing sites exists (i.e., only a single secondary site is available) and the single available secondary data processing site does not have all the golden virtual machine images needed to perform a particular customer workload (Case 0 is not further considered in this specification); 2) Case 1 where no choice of candidate secondary data processing sites exists (i.e., only a single secondary site is available), but the single available secondary data processing site has a combination of up-to-date and out-of-date golden virtual machine images in its image repository; 3) Case 2 where a choice of secondary data processing sites does exist (i.e., multiple secondary sites are potentially available) and a set of up-to-date golden virtual machine images is available across the image repositories of the set of multiple candidate secondary data processing sites; and 4) Case 3 where a choice of secondary data processing sites does exist (i.e., multiple secondary sites are potentially available) and a combination of up-to-date and out-of-date golden virtual machine images are available across the image repositories of the set of multiple candidate secondary data processing sites.

Illustrative embodiments select the appropriate secondary data processing site from the set of candidate secondary data processing sites and generate the appropriate set of virtual machine seed images in the storage of the selected secondary data processing site. Furthermore, illustrative embodiments may utilize a phantom virtual machine seed image located in the storage of the selected secondary data processing site to receive state data updates from the primary running virtual machine on the primary data processing site when the virtual machine seed image storage on the selected secondary data processing site has not yet been generated from the appropriate golden virtual machine image. Illustrative embodiments generate the golden virtual machine image on the selected secondary data processing site from golden images at the primary data processing site and golden images from one or more candidate secondary data processing sites not selected in the set candidate secondary data processing sites.

A phantom virtual machine seed image is a thin-provisioned storage volume that illustrative embodiments may utilize as a primary virtual machine state data replication target resident on the secondary data processing site, instead of a virtual machine seed image that has not yet been generated in storage of the selected secondary data processing site. Illustrative embodiments may not have generated the virtual machine seed image because the appropriate version of the golden virtual machine image may not yet exist in the image repository of the selected secondary data processing site, for example.

The phantom virtual machine seed image allows state data replication to proceed from the primary data processing site to the selected secondary data processing site, which contains the phantom virtual machine seed image, before the secondary virtual machine seed image is fully generated. After illustrative embodiments generate a partial virtual machine seed image in storage of the selected secondary data processing site (e.g., by a normal provisioning process, by copying from a different candidate secondary data processing site, or by updating an out-of-date virtual machine seed image), illustrative embodiments merge the contents of the phantom virtual machine seed image with the newly generated partial virtual machine seed image to form a complete up-to-date virtual machine seed image containing the latest state data replicas from the primary running virtual machine image on the primary data processing site. Afterward, illustrative embodiments may delete the phantom virtual machine seed image from the storage of the selected secondary data processing site.

Regarding Case 1 above where no choice of candidate secondary data processing sites exists, but the single available secondary data processing site has a combination of up-to-date and out-of-date golden virtual machine images in its image repository, illustrative embodiments perform the single virtual machine deployment process described above for every virtual machine corresponding to the customer workload that has a corresponding golden virtual image at the primary data processing site and the single available secondary data processing site. In addition, illustrative embodiments generate phantom virtual machine seed images for golden virtual machine images that are out-of-date on the single available secondary data processing site. Then, illustrative embodiments start the customer workload on the primary data processing site and initiate state data replication to the phantom virtual machine seed images on the single available secondary data processing site. Further, illustrative embodiments update, in the background, the out-of-date golden virtual machine images on the single available secondary data processing site to match the golden virtual machine image version used on the primary data processing site. Out-of-date golden virtual images can be updated in a number of ways, such as, for example, by booting the out-of-date golden virtual images to produce a virtual machine instance, installing patches or software upgrades on the running out-of-date golden virtual machine instance, and then suspending the running out-of-date golden virtual machine instance to produce an updated golden virtual machine image. Another method is to directly update known locations or blocks within the out-of-date golden virtual images with binary data corresponding to the desired update. After illustrative embodiments update the out-of-date golden virtual machine image on the single available secondary data processing site, illustrative embodiments generate a partial virtual machine seed image from that updated golden virtual machine image. Afterward, illustrative embodiments merge the phantom virtual machine seed image with the partial virtual machine seed image to generate a complete up-to-date virtual machine seed image in the storage of the single available secondary data processing site. Then, illustrative embodiments may delete the phantom virtual machine seed image from the storage of the single available secondary data processing site.

Regarding Case 2 above where a choice of secondary data processing sites does exist and a set of up-to-date golden virtual machine images is available across the image repositories of the set of candidate secondary data processing sites, illustrative embodiments select a secondary site from the set that has the largest number of up-to-date golden virtual machine images that matches the customer workload being performed on the primary data processing site. Then, illustrative embodiments perform the single virtual machine deployment process described above for every virtual machine corresponding to the customer workload that has a corresponding golden virtual image at the primary data processing site and the selected secondary data processing site. In addition, illustrative embodiments generate phantom virtual machine seed images for golden virtual machine images corresponding to the customer workload on the primary data processing site that are not resident on the selected secondary data processing site. Further, illustrative embodiments start the customer workload on the primary data processing site and initiate state data replication to the selected secondary data processing site. Furthermore, illustrative embodiments lazy copy the golden virtual machine images not resident on the selected secondary data processing site from other secondary data processing sites not selected in the set of candidate secondary data processing sites. As an example of a lazy copy of the golden virtual machine image, illustrative embodiments can copy the data to the golden virtual machine image only as it needed and consumed at the secondary site. After illustrative embodiments lazy copy the golden virtual machine images not resident on the selected secondary data processing site to the selected secondary data processing site, illustrative embodiments generate a partial virtual machine seed image from each golden virtual machine image. Afterward, illustrative embodiments merge the phantom virtual machine seed images with the partial virtual machine seed images to generate complete up-to-date virtual machine seed images in the storage of the selected secondary data processing site. Then, illustrative embodiments may delete the phantom virtual machine seed images from the storage of the selected secondary data processing site.

As an example, suppose there are two possible candidate secondary data processing sites, site A and site B. Site A has up-to-date golden virtual machine images that match 75% of the customer workload on the primary data processing site. Site B has up-to-date golden virtual machine images that match 25% of the customer workload on the primary data processing site. In this example, illustrative embodiments select site A as the secondary data processing site for disaster recovery for the customer workload because site A has 75% of the up-to-date golden virtual machine images matching the customer workload on the primary data processing site. Illustrative embodiments then proceed with performing the single virtual machine deployment process described above for every virtual machine corresponding to the customer workload and generating phantom virtual machine seed images for the remaining 25% of the golden virtual machine images not resident on site A. Furthermore, illustrative embodiments lazy copy the remaining 25% of the up-to-date golden virtual machine images from site B to site A.

Regarding Case 3 above where a choice of secondary data processing sites does exist and a combination of up-to-date and out-of-date golden virtual machine images are available across the image repositories of the set of candidate secondary data processing sites, illustrative embodiments select a secondary site from the set that has the largest number of out-of-date golden virtual machine images that matches the customer workload being performed on the primary data processing site. Illustrative embodiments select the site with the largest number of out-of-date golden virtual machine images because bringing an out-of-date golden virtual machine image up to date is less expensive than copying an up-to-date golden virtual machine image across the network. Alternatively, illustrative embodiments may select a site with the largest number of out-of-date golden virtual machine images that can be brought up to date with the fewest number of steps. Subsequently, illustrative embodiments perform the single virtual machine deployment process described above for every virtual machine corresponding to the customer workload that has a corresponding golden virtual image at the primary data processing site and the selected secondary data processing site. Illustrative embodiments also generate phantom virtual machine seed images for golden virtual machine images corresponding to the customer workload on the primary data processing site that are not resident on the selected secondary data processing site or that are resident on the selected secondary data processing site, but need to be brought up to date. Then, illustrative embodiments start the customer workload on the primary data processing site and initiate state data replication to the selected secondary data processing site. After illustrative embodiments copy a golden virtual machine image not resident on the selected secondary data processing site to the selected secondary data processing site, illustrative embodiments generate a partial virtual machine seed image from that golden virtual machine image and merge the phantom virtual machine seed image with the partial virtual machine image to form a complete up-to-date virtual machine image in the storage of the selected secondary data processing site. After illustrative embodiments bring an out-of-date golden virtual machine image up to date, illustrative embodiments generate a partial virtual machine seed image from that golden virtual machine image and merge the phantom virtual machine seed image with the partial virtual machine seed image to generate a complete up-to-date virtual machine seed image in the storage of the selected secondary data processing site.

Illustrative embodiments do not execute the secondary virtual machine on the secondary data processing site when the primary virtual machine is executing on the primary processing site. The secondary virtual machine is in a suspended state and illustrative embodiments do not apply any patches to the suspended secondary virtual machine. However, illustrative embodiments are continuously replicating all state data updates, whether application updates, patch updates, or customer data updates, in the storage corresponding to the primary virtual machine to the storage corresponding to the secondary virtual machine, which is not executing, at the secondary or disaster recovery site. When the secondary virtual machine is needed for disaster recovery, illustrative embodiments start the secondary virtual machine from its corresponding image, which is an identical image to the primary virtual machine's image due to the continuous updates, in the storage on the secondary data processing site.

Thus, illustrative embodiments eliminate the requirement to electronically replicate large golden virtual machine seed images from a primary data processing site to a secondary data processing site. In addition, illustrative embodiments eliminate the requirement to generate tapes and/or other types of bulk storage of golden virtual machine images and to transport the bulk storage to secondary data processing sites for processing. Further, illustrative embodiments may utilize existing infrastructure and functionality, such as, for example, image repositories and image deployment management tools, on the primary and secondary data processing sites. Furthermore, illustrative embodiments solve the problem of secondary data processing site selection and out-of-date golden virtual machine images.

Figure 5:
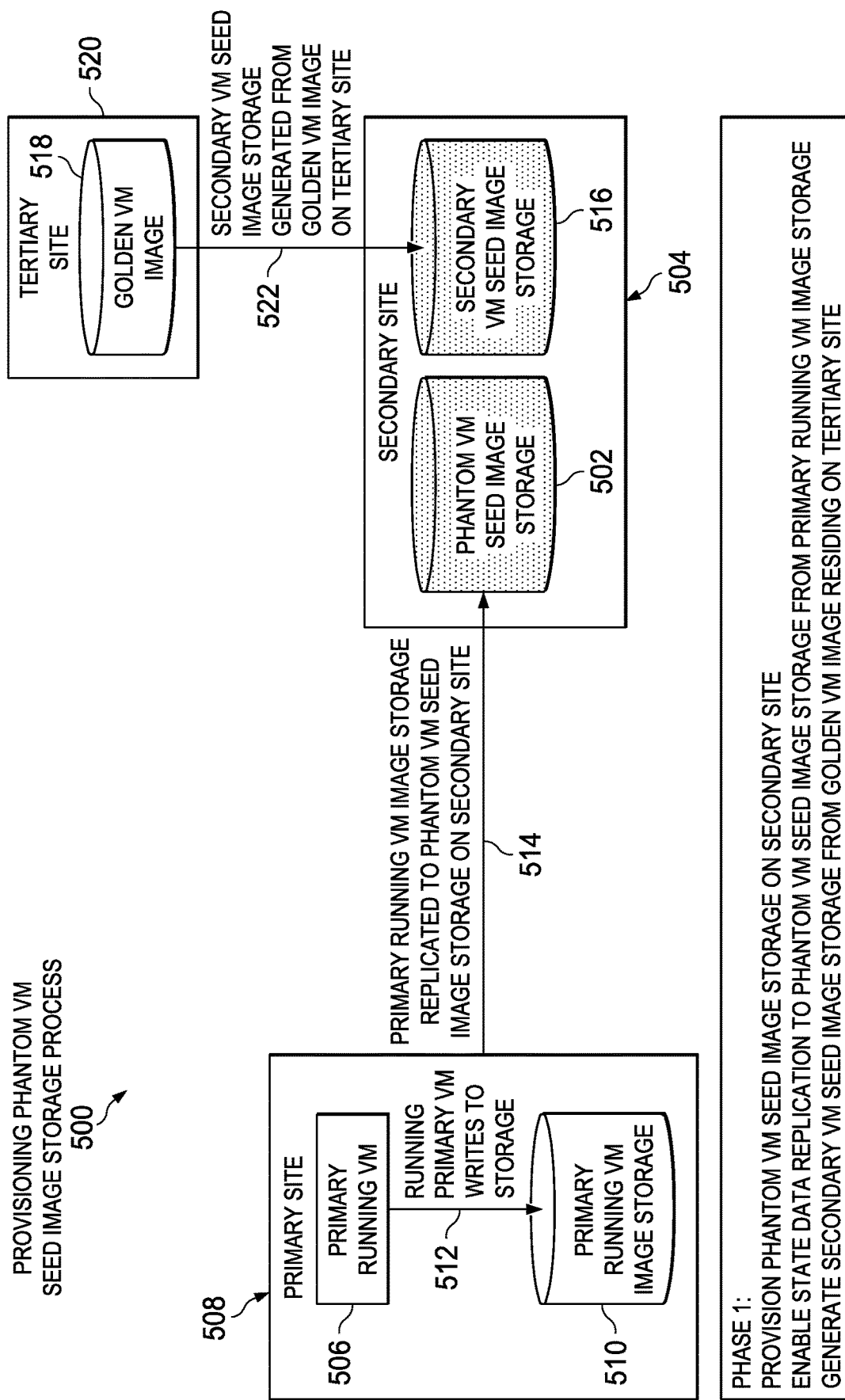
FIG. 5 is a diagram of provisioning phantom virtual machine seed image storage in accordance with an illustrative embodiment.

With reference now to FIG. 5, a diagram of provisioning phantom virtual machine seed image storage is depicted in accordance with an illustrative embodiment. Provisioning phantom virtual machine (VM) seed image storage process 500 may be implemented in, for example, a network of data processing systems, such as network data processing system 100 in FIG. 1 or a cloud computing environment, such as cloud computing environment 300 in FIG. 3. Provisioning phantom virtual machine seed image storage process 500 represents the process of provisioning phantom virtual machine seed image storage 502 on secondary site 504. Secondary site 504 may be, for example, client 112 in FIG. 1. Secondary site 504 is a failover recovery data processing site. Secondary site 504 provisions phantom virtual machine seed image storage 502 on secondary site 504 because a golden virtual machine image corresponding to a particular customer workload being executed by primary running virtual machine 506 on primary site 508 is not resident on secondary site 504.

Primary running virtual machine 506 on primary site 508 writes to primary running virtual machine image storage 510 at 512. Primary running virtual machine 506 represents a set of one or more virtual machines that are executing the customer workload. The customer workload may be, for example, customer workload 220 in FIG. 2. Primary site 508 may be, for example, client 110 in FIG. 1. The writes to primary running virtual machine image storage 510 include state data updates corresponding to primary running virtual machine 506 as primary running virtual machine 506 executes the customer workload. The state data updates corresponding to primary running virtual machine 506 may be, for example, primary virtual machine state data updates 226 in FIG. 2.

In addition, primary site 508 replicates the contents of primary running virtual machine image storage 510 and sends the replicated contents to phantom virtual machine seed image storage 502 on secondary site 504 at 514. Further, secondary site 504 generates secondary virtual machine image storage 516 from golden virtual machine image 518 received from tertiary site 520 at 522. Secondary virtual machine image storage 516 corresponds to the customer workload being executed by primary running virtual machine 506. Tertiary site 520 may be, for example, client 114 in FIG. 1. Tertiary site 520 represents a candidate secondary data processing site in a set of two or more candidate secondary data processing sites that illustrative embodiments did not select as a failover data processing site for the customer workload. However, tertiary site 520 does contain an appropriate version of the golden virtual machine image corresponding to the customer workload not resident on secondary site 504.

Figure 6:
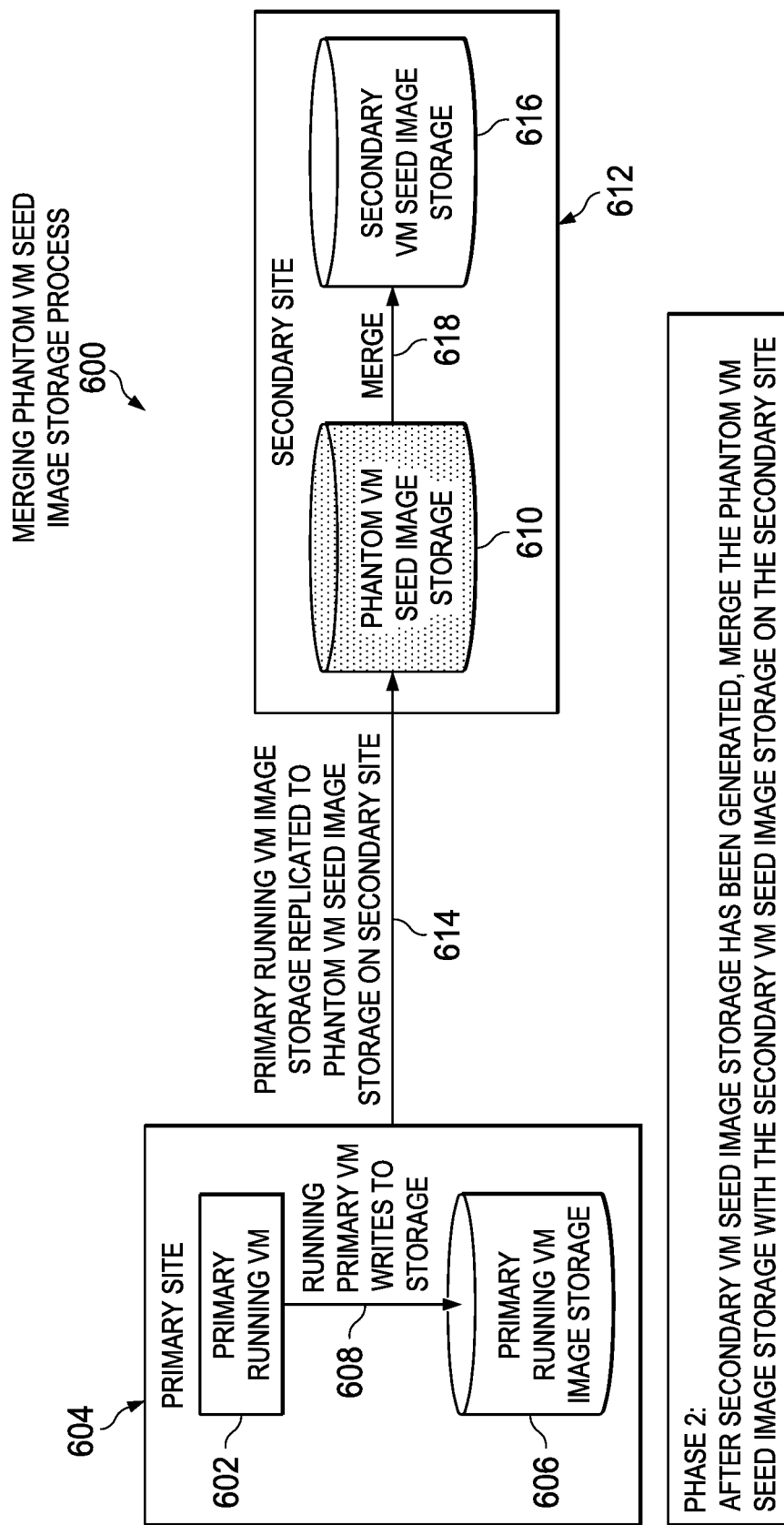
FIG. 6 is a diagram of merging phantom virtual machine seed image storage in accordance with an illustrative embodiment.

With reference now to FIG. 6, a diagram of merging phantom virtual machine seed image storage is depicted in accordance with an illustrative embodiment. Merging phantom virtual machine seed image storage process 600 may be implemented in, for example, a network of data processing systems, such as network data processing system 100 in FIG. 1 or a cloud computing environment, such as cloud computing environment 300 in FIG. 3.

As primary running virtual machine 602 on primary site 604 continues to write to primary running virtual machine image storage 606 at 608, primary site 604 continues to replicate the contents of primary running virtual machine image storage 606 and send the replicated contents to phantom virtual machine seed image storage 610 on secondary site 612 at 614. Primary running virtual machine 602, primary site 604, and primary running virtual machine image storage 606 may be, for example, primary running virtual machine 506, primary site 508, and primary running virtual machine image storage 510 in FIG. 5. Phantom virtual machine seed image storage 610 and secondary site 612 may be, for example, phantom virtual machine seed image storage 502 and secondary site 504 in FIG. 5.

After secondary site 612 generates secondary virtual machine seed image storage 616 from a golden virtual machine image, secondary site 612 merges the content of phantom virtual machine seed image storage 610 with secondary virtual machine seed image storage 616 at 618. Secondary virtual machine seed image storage 616 may be, for example, secondary virtual machine seed image storage 516 in FIG. 5. The golden virtual machine image may be, for example, a golden virtual machine image received by secondary site 612 from a tertiary site, such as golden virtual machine image 518 received by secondary site 504 from tertiary site 520 in FIG. 5. Merging phantom virtual machine seed image storage 610 with secondary virtual machine seed image storage 616 forms a complete up-to-date secondary virtual machine seed image storage capable of generating a virtual machine ready to execute a customer workload during failover.

Figure 7:
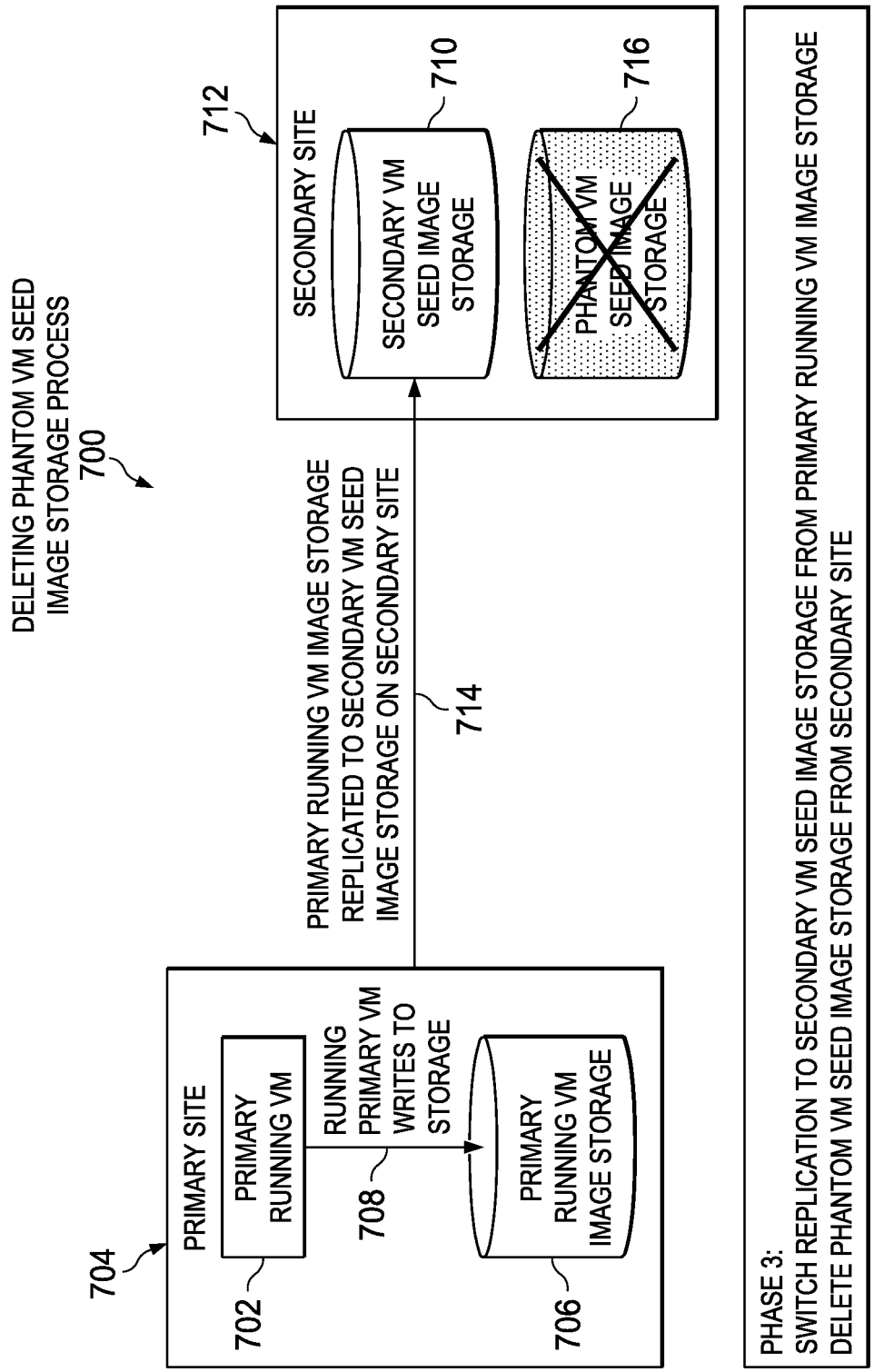
FIG. 7 is a diagram of deleting phantom virtual machine seed image storage in accordance with an illustrative embodiment.

With reference now to FIG. 7, a diagram of deleting phantom virtual machine seed image storage is depicted in accordance with an illustrative embodiment. Deleting phantom virtual machine seed image storage process 700 may be implemented in, for example, a network of data processing systems, such as network data processing system 100 in FIG. 1 or a cloud computing environment, such as cloud computing environment 300 in FIG. 3.

As primary running virtual machine 702 on primary site 704 continues to write to primary running virtual machine image storage 706 at 708, primary site 704 continues to replicate the contents of primary running virtual machine image storage 706 and switches sending the replicated contents to secondary virtual machine seed image storage 710 on secondary site 712 at 714. Primary running virtual machine 702, primary site 704, and primary running virtual machine image storage 706 may be, for example, primary running virtual machine 602, primary site 604, and primary running virtual machine image storage 606 in FIG. 6. Secondary virtual machine seed image storage 710 and secondary site 712 may be, for example, secondary virtual machine seed image storage 616 and secondary site 612 in FIG. 6. After primary site 704 switches sending the replicated contents of primary running virtual machine image storage 706 to secondary virtual machine seed image storage 710 from phantom virtual machine seed image storage 716, secondary site 712 deletes phantom virtual machine seed image storage 716 from secondary site 712. Phantom virtual machine seed image storage 716 may be, for example, phantom virtual machine seed image storage 610 in FIG. 6.

Figure 8:
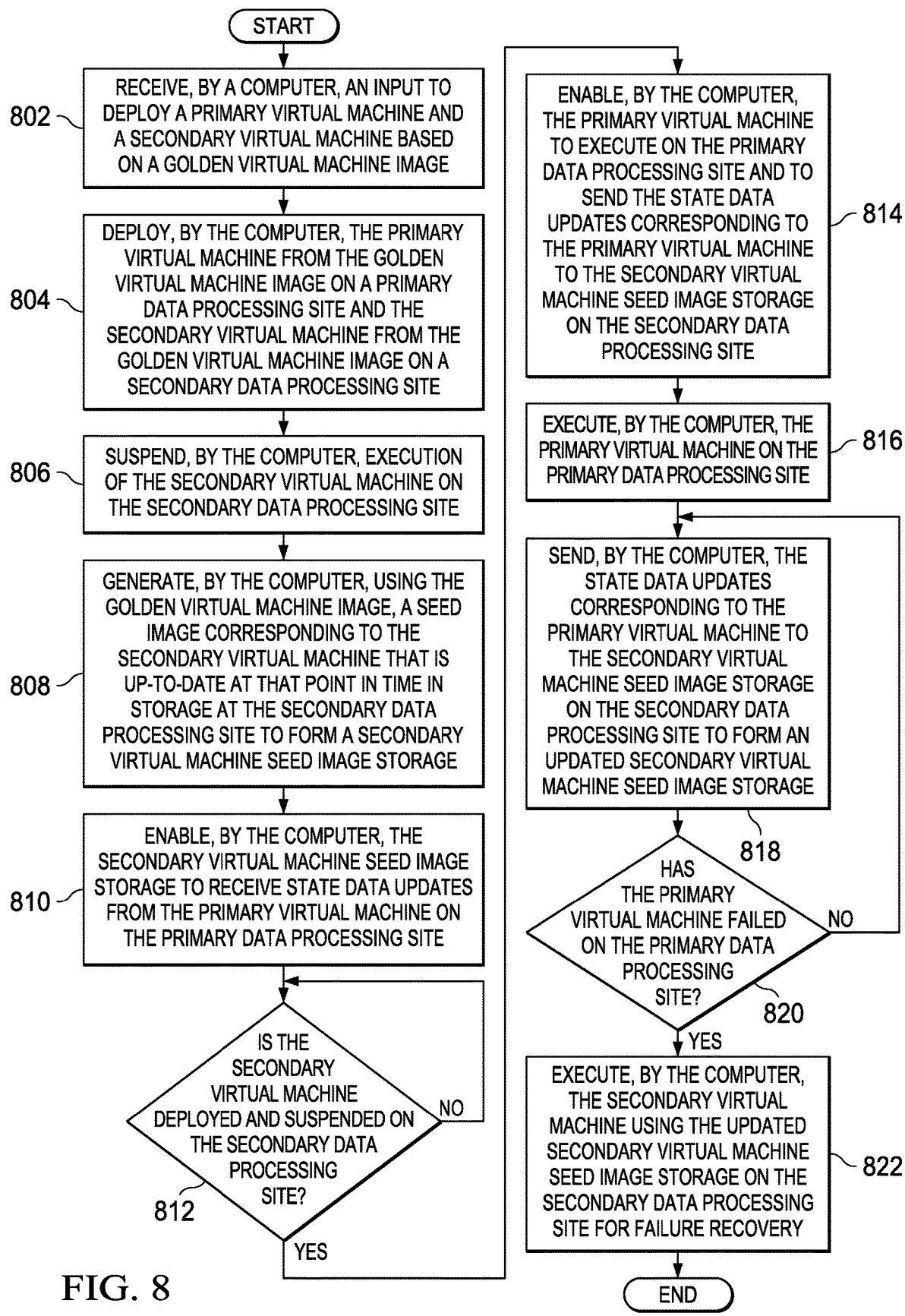
FIG. 8 is a flowchart illustrating a process for generating secondary virtual machine seed image storage at a secondary data processing site for disaster recovery in accordance with an illustrative embodiment.

With reference now to FIG. 8, a flowchart illustrating a process for generating secondary virtual machine seed image storage at a secondary data processing site for disaster recovery is shown in accordance with an illustrative embodiment. The process shown in FIG. 6 may be implemented in a computer, such as, for example, server 104 in FIG. 1, data processing system 200 in FIG. 2, or a cloud computing node in cloud computing nodes 310 in FIG. 3.

The process begins when the computer receives an input to deploy a primary virtual machine and a secondary virtual machine based on a golden virtual machine image (step 802). In response to the input at step 802, the computer deploys the primary virtual machine from the golden virtual machine image on a primary data processing site and the secondary virtual machine from the golden virtual machine image on a secondary data processing site (step 804). In addition, the computer suspends execution of the secondary virtual machine on the secondary data processing site (step 806).

Further, the computer, using the golden virtual machine image, generates a seed image corresponding to the secondary virtual machine that is up-to-date at that point in time in storage at the secondary data processing site to form a secondary virtual machine seed image storage (step 808). Furthermore, the computer enables the secondary virtual machine seed image storage to receive state data updates from the primary virtual machine on the primary data processing site (step 810). Moreover, the computer makes a determination as to whether the secondary virtual machine is deployed and suspended on the secondary data processing site (step 812).

If the computer determines that the secondary virtual machine is not deployed and suspended on the secondary data processing site, no output of step 812, then the process returns to step 812 where the computer continues to wait for the secondary virtual machine to be deployed and suspended on the secondary data processing site. If the computer determines that the secondary virtual machine is deployed and suspended on the secondary data processing site, yes output of step 812, then the computer enables the primary virtual machine to execute on the primary data processing site and to send the state data updates corresponding to the primary virtual machine to the secondary virtual machine seed image storage on the secondary data processing site (step 814).

In addition, the computer executes the primary virtual machine on the primary data processing site (step 816). The computer also sends the state data updates corresponding to the primary virtual machine to the secondary virtual machine seed image storage on the secondary data processing site to form an updated secondary virtual machine seed image storage (step 818). Further, the computer makes a determination as to whether the primary virtual machine failed on the primary data processing site (step 820).

If the computer determines that the primary virtual machine has not failed on the primary data processing site, no output of step 820, then the process returns to step 818 where the computer continues to send the state data updates corresponding to the primary virtual machine to the secondary virtual machine seed image storage on the secondary data processing site. If the computer determines that the primary virtual machine has failed on the primary data processing site, yes output of step 820, then the computer executes the secondary virtual machine using the updated secondary virtual machine seed image storage on the secondary data processing site for failure recovery (step 822). Thereafter, the process terminates.

Thus, illustrative embodiments of the present invention provide a computer-implemented method, computer system, and computer program product for generating secondary virtual machine seed image storage at a secondary data processing site for disaster recovery. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for generating secondary virtual machine seed image storage, the computer-implemented method comprising:
    receiving, by a computer, an input to deploy a primary virtual machine on a primary data processing site and a secondary virtual machine on a secondary data processing site, wherein a first copy of a golden virtual machine image used to deploy the primary virtual machine is maintained on the primary data processing site, and wherein an out-of-date copy of the golden virtual machine image is stored on the secondary data processing site;

responsive to the computer receiving the input, deploying, by the computer, the primary virtual machine from the first copy of the golden virtual machine image on the primary data processing site, generating a phantom virtual machine seed image on the secondary data processing site, and deploying the secondary virtual machine from the out-of-date copy of the golden virtual machine image on the secondary data processing site;

enabling, by the computer, the primary virtual machine to execute on the primary data processing site and sending, by the computer, state data updates corresponding to the primary virtual machine to the secondary data processing site;

utilizing, by the computer, the phantom virtual machine seed image to receive the state data updates from the primary virtual machine while running software on the secondary virtual machine to update the out-of-date copy of the golden virtual machine image to match the first copy of the golden virtual machine image;

suspending, by the computer, execution of the secondary virtual machine on the secondary data processing site;

generating, by the computer, a complete seed image corresponding to the secondary virtual machine that is up-to-date at that point in time in storage at the secondary data processing site to form the secondary virtual machine seed image storage by merging a partial seed image generated from the updated golden virtual machine image with the phantom virtual machine seed image; and enabling, by the computer, the secondary virtual machine seed image storage to receive state data updates from the primary virtual machine on the primary data processing site.

2. The computer-implemented method of claim 1 further comprising:

responsive to the computer determining that the primary virtual machine has failed on the primary data processing site, executing, by the computer, the secondary virtual machine using the secondary virtual machine seed image storage on the secondary data processing site for failure recovery.

3. The computer-implemented method of claim 1, wherein the first copy of the golden virtual machine image is customizable and deployable to generate production virtual machine images on the primary data processing site.

4. The computer-implemented method of claim 1, wherein the computer deploys the primary virtual machine on the primary data processing site and the secondary virtual machine on the secondary data processing site at a same time.

5. The computer-implemented method of claim 1, wherein the computer deletes the phantom virtual machine seed image from the storage of the secondary data processing site after merging content of the phantom virtual machine seed image with the partial seed image on the secondary data processing site.

6. The computer-implemented method of claim 1, wherein the software executed to update the out-of-date golden virtual machine image on the secondary data processing site is one or more of a patch or an upgrade.

7. The computer-implemented method of claim 1, further comprising:

selecting, by the computer, a site from a set of candidate data processing sites to be the secondary data processing site based on the versions of the golden virtual machine images on the candidate sites and a customer workload being performed on the primary data processing site.

8. The computer-implemented method of claim 7, wherein the computer lazy copies golden virtual machine images not resident on the selected secondary site from other secondary data processing sites not selected in the set of candidate secondary data processing sites.

9. A computer system for generating secondary virtual machine seed image storage, the computer system comprising:

a bus system;

a storage device connected to the bus system, wherein the storage device stores program instructions; and a processor connected to the bus system, wherein the processor executes the program instructions to:

receive an input to deploy a primary virtual machine on a primary data processing site and a secondary virtual machine on a secondary data processing site, wherein a first copy of a golden virtual machine image used to deploy the primary virtual machine is maintained on the primary data processing site, and wherein an out-of-date copy of the golden virtual machine image is stored on the secondary data processing site;

deploy the primary virtual machine from the first copy of the golden virtual machine image on the primary data processing site, generate a phantom virtual machine seed image on the secondary data processing site, and deploy the secondary virtual machine from the out-of-date copy of the golden virtual machine image on the secondary data processing site in response to receiving the input;

enable the primary virtual machine to execute on the primary data processing site and send state data updates corresponding to the primary virtual machine to the secondary data processing site;

utilize the phantom virtual machine seed image to receive the state data updates from the primary virtual machine while running software on the secondary virtual machine to update the out-of-date copy of the golden virtual machine image to match the first copy of the golden virtual machine image;

suspend execution of the secondary virtual machine on the secondary data processing site;

generate a complete seed image corresponding to the secondary virtual machine that is up-to-date at that point in time in storage at the secondary data processing site to form the secondary virtual machine seed image storage by merging a partial seed image generated from the updated golden virtual machine image with the phantom virtual machine seed image; and enable the secondary virtual machine seed image storage to receive state data updates from the primary virtual machine on the primary data processing site.

10. The computer system of claim 9, wherein the processor further executes the program instructions to:

delete the phantom virtual machine seed image from the storage on the secondary data processing site after merging the phantom virtual machine seed image with the partial seed image on the secondary data processing site.

11. The computer system of claim 9, wherein the processor further executes the program instructions to:

execute the secondary virtual machine using the secondary virtual machine seed image storage on the secondary data processing site for failure recovery in response to determining that the primary virtual machine has failed.

12. The computer system of claim 9, wherein the first copy of the golden virtual machine image is customizable and deployable to generate production virtual machine images on the primary data processing site.

13. A computer program product for generating secondary virtual machine seed image storage, the computer program product comprising a computer readable storage medium having program instructions embodied therewith, the program instructions executable by a computer to cause the computer to perform a method comprising:

receiving, by the computer, an input to deploy a primary virtual machine on a primary data processing site and a secondary virtual machine on a secondary data processing site, wherein a first copy of a golden virtual machine image used to deploy the primary virtual machine is maintained on the primary data processing site, and wherein an out-of-date copy of the golden virtual machine image is stored on the secondary data processing site;

responsive to the computer receiving the input, deploying, by the computer, the primary virtual machine from the first copy of the golden virtual machine image on the primary data processing site, generating a phantom virtual machine seed image on the secondary data processing site, and deploying the secondary virtual machine from the out-of-date copy of the golden virtual machine image on the secondary data processing site;

enabling, by the computer, the primary virtual machine to execute on the primary data processing site and sending, by the computer, state data updates corresponding to the primary virtual machine to the secondary data processing site;

utilizing, by the computer, the phantom virtual machine seed image to receive the state data updates from the primary virtual machine while running software on the secondary virtual machine to update the out-of-date copy of the golden virtual machine image to match the first copy of the golden virtual machine image;

suspending, by the computer, execution of the secondary virtual machine on the secondary data processing site;

generating, by the computer, a complete seed image corresponding to the secondary virtual machine that is up-to-date at that point in time in storage at the secondary data processing site to form the secondary virtual machine seed image storage by merging a partial seed image generated from the updated golden virtual machine image with the phantom virtual machine seed image; and enabling, by the computer, the secondary virtual machine seed image storage to receive state data updates from the primary virtual machine on the primary data processing site.

14. The computer program product of claim 13 further comprising:

responsive to the computer determining that the primary virtual machine has failed on the primary data processing site, executing, by the computer, the secondary virtual machine using the secondary virtual machine seed image storage on the secondary data processing site for failure recovery.

15. The computer program product of claim 13, wherein the first copy of the golden virtual machine image is customizable and deployable to generate production virtual machine images on the primary data processing site.

16. The computer program product of claim 13, wherein the computer deletes the phantom virtual machine seed image from the storage of the secondary data processing site after merging content of the phantom virtual machine seed image with the partial seed image on the secondary data processing site.

* * * * *